United States Patent [19]

Hinton

[11] Patent Number: 4,879,075
[45] Date of Patent: Nov. 7, 1989

[54] EVAPORATIVE AIR COOLING APPARATUS

[76] Inventor: Robert A. Hinton, 14006 Fairoak Crossing, San Antonio, Tex. 78231-1914

[21] Appl. No.: 243,622

[22] Filed: Sep. 13, 1988

[51] Int. Cl.$^4$ ............................................. B01F 3/04
[52] U.S. Cl. ...................................... 261/26; 261/30; 261/103; 261/66; 98/30
[58] Field of Search ...................... 98/30; 261/29, 103, 261/104, 27, 26, 30, 66

[56] References Cited

U.S. PATENT DOCUMENTS

| | | | |
|---|---|---|---|
| 1,270,613 | 6/1918 | Gustavson | 98/30 |
| 2,224,201 | 12/1940 | Siedle | 261/92 |
| 2,551,227 | 5/1951 | Yost | 261/92 |
| 2,584,618 | 2/1952 | Robic | 261/92 |
| 2,835,185 | 5/1958 | Leatherman | 98/30 |
| 3,167,601 | 1/1965 | Schlising | 261/104 |
| 3,493,219 | 2/1970 | Stachowiak et al. | 261/103 |
| 4,181,690 | 1/1980 | Neu | 98/30 |
| 4,284,128 | 8/1981 | Nelson | 261/29 |
| 4,312,819 | 1/1982 | Leyland | 98/30 |
| 4,618,462 | 10/1986 | Fisher | 261/104 |

FOREIGN PATENT DOCUMENTS 1135595 12/1956 France ........................... 98/30

Primary Examiner—Tim Miles

[57] ABSTRACT

An evaporative cooler apparatus and method of operation are disclosed. The invention was conceived and developed to humidify and cool the attic space between the roof and the ceiling of man-made buildings or other structures. The apparatus is comprised of an induced draft fan assembly which blows air through an evaporation bundle comprised of one or more concentric cylinders of fibrous evaporation pads. The most advantageous embodiments of the invention and optimum parameters of operation result in reduced costs for installation, for evaporation water, for electrical power, and for service and maintenance as compared with devices of the prior art.

3 Claims, 3 Drawing Sheets

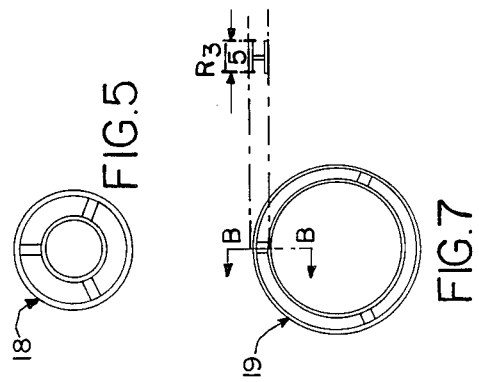
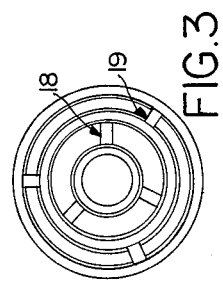
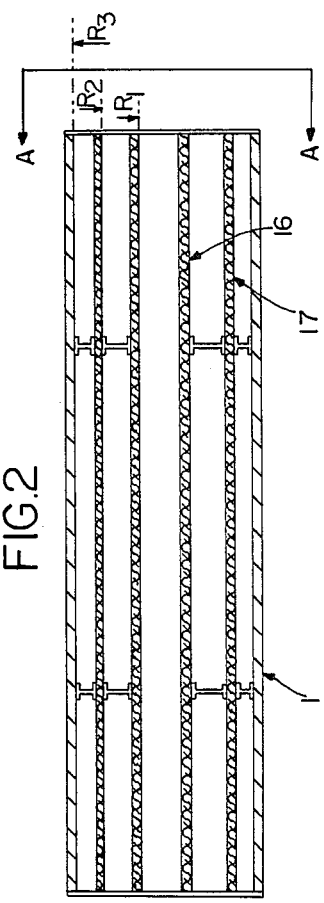
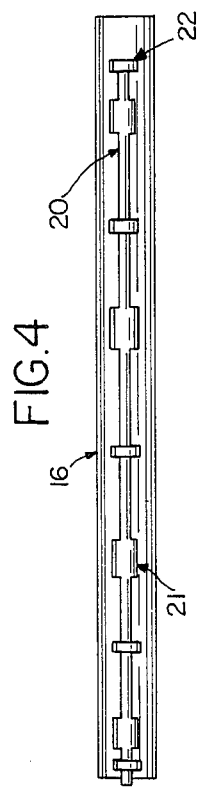
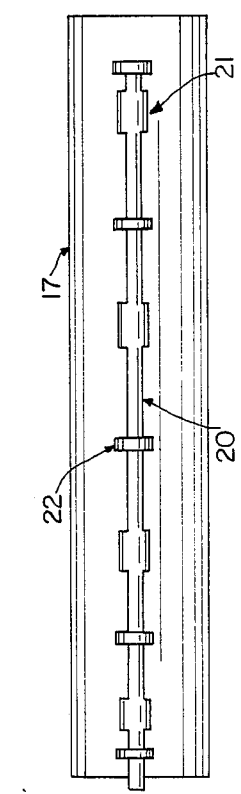

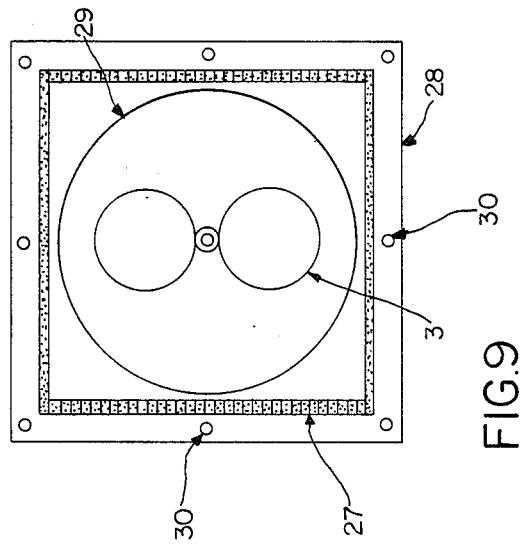
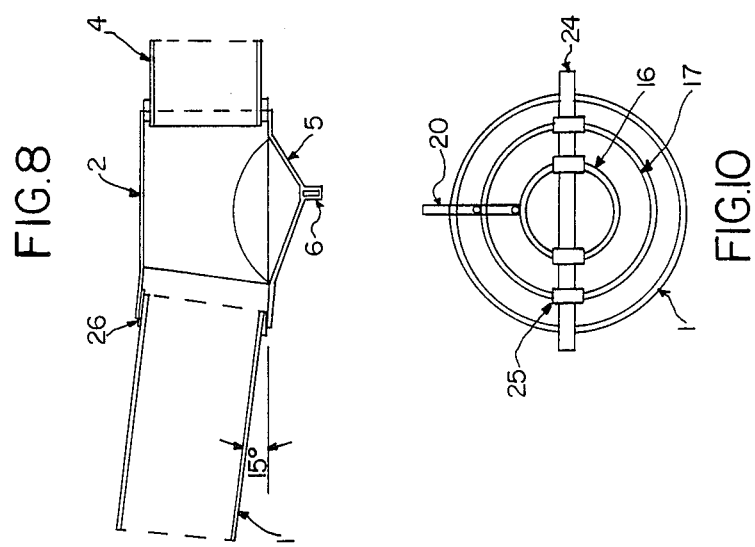

EVAPORATIVE AIR COOLING APPARATUS

FIELD AND PRIOR ART OF THE INVENTION

1. Field of the Invention

This invention relates to mechanical devices for cooling of air. In a further aspect, the present invention relates to evaporative coolers of the type having wettable pads with extended surface to provide capillary water flow and enhanced water evaporation rate into the stream of air flow. More particularly, the present invention concerns means for improving the efficiency and reliability of evaporative coolers.

2. Description of the Prior Art

Evaporative cooling is a well known means for cooling air, usually within an enclosure such as a man-made building or similar structure. Evaporative cooling provides several desirable characteristics, such as less energy input than compressor dependent refrigeration systems, periodic air exchange within an air conditioned space, and humidification of dry air.

Many devices have been invented, developed, and manufactured to accomplish evaporative cooling of air. These inventions have been searched in class/subclasses 98/30 and 261/94 and 261/100. The following patent references provide specific citations of the state of the invention art in the pertinent classifications.

U.S. Pat. No. 4,556,521 to Baigas (1985), describes the invention of evaporation pads comprised of high loft fibers with a coating of hydrophilic foam to optimize cooling efficiency.

U.S. Pat. No. 4,379,712 to Sperr and Sperr (1983), describes the invention of baffles and shrouds to increase air contact time with evaporation pads, and provide more efficient countercurrent flow. Water is sprayed from a plurality of orifices spaced along a manifold to wet the upper edge of the evaporation pads.

U.S. Pat. No. 4,361,525 to Leyland (1982), describes passing air through a chilled water heat exchanger mechanism and then through an evaporative cooler to improve cooling efficiency.

Many other inventions have contributed to the development of the state of the art. Relevant disclosures and classes may be cited:

| U.S. PATENT DOCUMENTS | | | |
|---|---|---|---|
| 743,528 | 11/1903 | Le Reau | 55/257 |
| 816,371 | 3/1906 | Platz | 261/DIG. 3 |
| 917,185 | 4/1909 | Taylor | 261/DIG. 3 |
| 2,035,625 | 3/1936 | Whitmer et al. | 261/DIG. 15 |
| 3,193,259 | 7/1965 | Liebmann | 261/DIG. 15 |
| 3,606,982 | 7/1971 | Anderson | 261/DIG. 4 |
| 4,040,824 | 8/1977 | Kinney | 261/112 X |
| 4,234,526 | 11/1980 | Mackay et al. | 261/DIG. 4 |
| 4,309,365 | 1/1982 | Van Ness | 261/DIG. 3 |

The inventions of the prior art have emphasized high rates of flow of air and water through contactor pads with high pressure drop. These inventions require large amounts of energy for air blowers and water pumps. None of the prior art devices have provided an easily assembled and maintained system which will operate for extended time intervals without service by the operator.

BACKGROUND OF THE INVENTION

Many man-made dwellings and other structures have an attic space which is separated from the living, working, or storage space by a ceiling. The roofs of these structures often become quite hot because of direct exposure to the electromagnetic rays from the sun. One purpose of the attic space is to provide an air space to insulate the living, working, or storage space below the ceiling from the great amount of energy which is radiated, conducted, and convected into the attic space from the roofing materials. The insulation effectiveness of the attic space varies substantially depending upon the provisions for natural circulation of outside air, provision of power ventilators to induce outside air circulation, and the thermal conductivity of the construction materials utilized for the ceiling and insulating substances.

The amount of energy conducted from the attic space through the ceiling may be diminished by cooling the air within the attic space. Evaporative cooling is especially suitable because of lower construction cost, lower installation cost, and lower operating cost as compared with alternatives such as compressor dependent refrigeration cycles. Since most attic spaces are not inhabited, the greatest human comfort objections to evaporative coolers such as high relative humidity and odor emission are not applicable.

The inventions described in the prior art of the invention are not well suited to cooling the air in attics. The prior art coolers are designed to humidify and cool very dry air for direct injection into living and working spaces for people. The coolers utilize relatively large amounts of energy for circulating water and forcing air through evaporation pads. The water must to treated, filtered, and otherwise purified to prevent growth of algae and other biological species which thrive in the operating conditions of evaporative coolers. The evaporative coolers require maintenance for cleaning and replacing evaporation pads. The motors, blowers, and pumps require periodic service and/or replacement.

OBJECTS OF THE INVENTION

It is an object of the invention to provide an evaporative cooling device for the purpose of cooling the air within the attic space of a man-made dwelling or structure.

It is a further object of the invention to cool and humidify the materials of construction for the roof and roof support structures to increase useful service life before repair or replacement.

It is an additional object of the invention to diminish the cost to manufacture and install the evaporative cooler as compared with the devices of the prior art.

It is a further object of the invention to diminish the cost of water and electricity as compared with the devices of the prior art.

It is another object of the invention to diminish the amount of filtration and pretreatment required to provide suitable evaporation It is still another object of the invention to provide an evaporative cooler which will operate unattended for one or more cooling seasons, and to greatly diminish the amount of maintenance and service required by the devices of the prior art.

SUMMARY OF THE INVENTION

These and other objects, functions, and advantages are achieved by the present invention. The embodiment of the invention is comprised of one or more concentric elements of evaporation pads, such as concentric cylinders, which are coupled by air conduction conduit to an induction air fan. The evaporation elements are mounted at an arbitrary angle, which may be approximately 15 degrees of arc, to utilize gravity flow of evaporation water through the evaporation pads. Trickle irrigation nozzles are utilized to distribute a continuous flow of fresh water along the top surface of each evaporation element. An excess flow of water is utilized to carry away dissolved salts, minerals, and other non-volatile contaminants of the water. The excess water is collected, and conveyed by conduit to lawn/garden irrigation service, or to the building waste water sewer system. Extended surface fibers may be utilized to facilitate water-to-air mass transfer from the evaporation pads into the air stream which flows countercurrent to the flow of water through the evaporation cylinders.

The foregoing and other objects of the present invention are more fully described and explained in the description of embodiment of the invention which follows. The details of the description may be more readily understood by reference to the accompanying drawings.

DESCRIPTION OF THE DRAWINGS

In the drawings

FIG. 2 through FIG. 7 are six drawings which illustrate an example for construction and assembly of the components of the evaporation bundle section of the embodiment of invention of FIG. 1.

FIG. 8 through FIG. 10 are three drawings which illustrate assembly of the evaporation bundle with all other portions of the embodiment of invention shown in FIG. 1.

DESCRIPTION OF THE PREFERRED EMBODIMENTS

Figure 1:
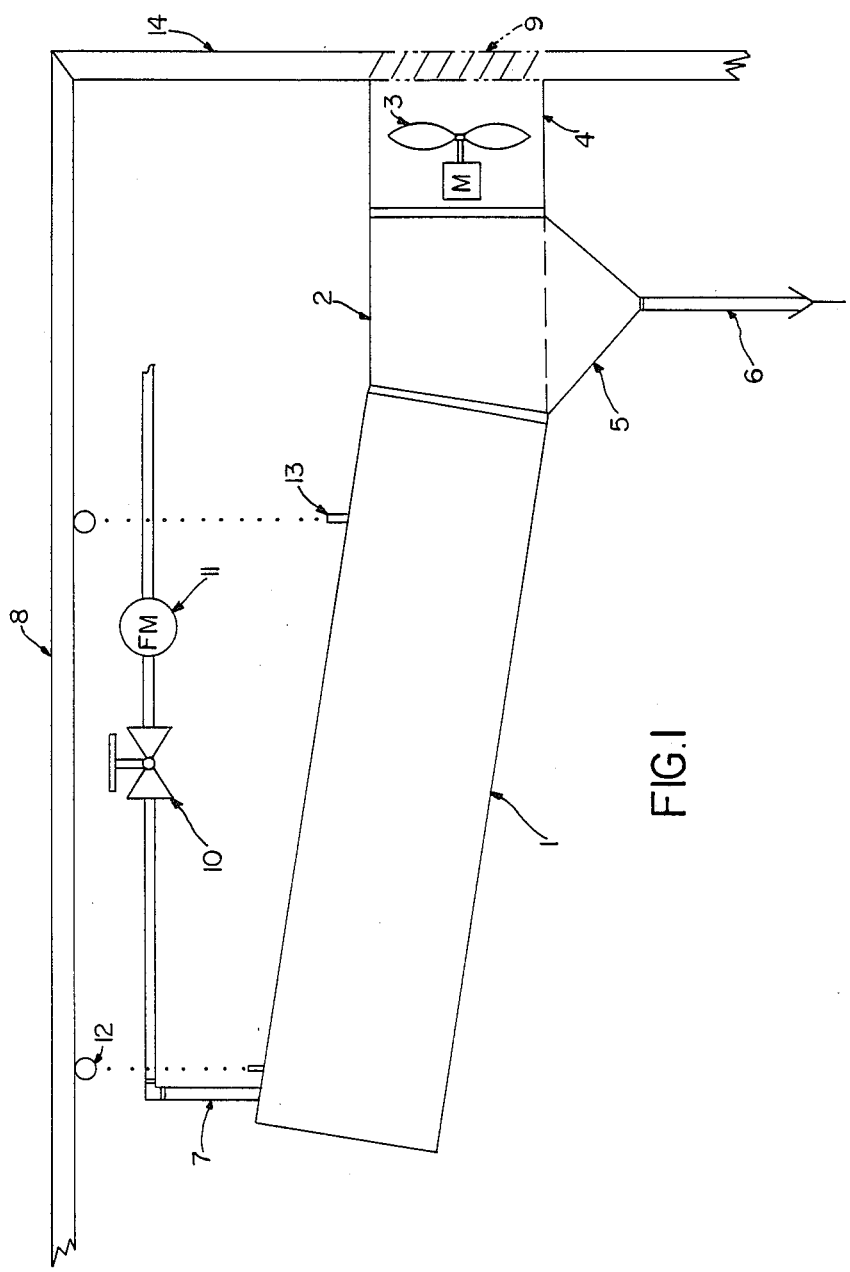
FIG. 1 is an elevation drawing which shows a preferred embodiment of the invention installed within the attic of a building.

While a preferred embodiment of the present invention will be described more fully hereinafter with reference to the accompanying drawings, it is to be understood at the beginning of this description that persons of skill in the arts may modify the physical components of the invention here described without departing from the spirit and scope of my claims of invention. Accordingly, the following description is to be understood as being only one physical embodiment presented for the purpose of teaching the invention to persons of skill in the appropriate arts, and not as limiting upon the scope of my claims of invention.

Referring to FIG. 1, an evaporative cooler device in accordance with the invention is shown with its basic components. These basic components are comprised of a cylindrical evaporation bundle 1, an adapter section 2, and an induced draft fan 3, which is contained within a cylindrical housing 4. The fan housing 4 is flanged directly to a screened, louvered aeration vent 9, which may be advantageously located under the roof gable in the verticle, outside wall 14 of a building or structure to be cooled. The evaporative cooling device is supported by chain, cable, cord, or similar means from fastener rings 12, which are bolted or welded securely to a roof support beam or member 8, to integral molded or fastened clevis devices 13, which are affixed to the top of the outer shell of the evaporation bundle 1.

The length of the support means between the fasteners, at least two devices 12 and at least two devices 13, are adjusted to provide natural, gravity induced flow of water through the media of construction of the evaporation pads, from the higher elevation air outlet of the evaporation bundle 1 toward the lower elevation air inlet of the cylindrical evaporation bundle 1. A specific angle of inclination is not an object of the invention. However, an angle of inclination, as measured from a horizontal disposition for the evaporation bundle 1, of greater than 15 degrees of arc and less than 30 degrees of arc, may provide most nearly optimum water distribution through the evaporation pads.

Referring to FIG. 9, the physical support installation of the embodiment of invention is completed by utilizing screws, bolts, or similar fasteners through the eight or more bored holes 30 in the mounting flange 28 to secure the evaporation device to the wall 14 of the building or structure to be cooled.

Again referring to FIG. 1, the functional installation of the embodiment of invention is completed by provision of electricity and water utility services. Electrical power is provided from a local utility meter through an on/off switch, circuits not shown in the drawings, to the drive motor M of the induced draft fan, 3. A thermostatically controlled on/off switch, not shown in the drawings, may be utilized advantageously to turn the fan motor on and off in accordance with preset temperature limits within the building attic space. Water is provided from a local utility meter or pump system, not shown in the drawings, through a flow indicating/metering device 11 and a flow control valve 10, through a pipe or tube conduit 7, into the evaporation bundle 1. As an alternative, a non-variable flow metering device, such as a restrictive orifice, may be utilized in place of the flow control devices flow indicator/meter 11 and flow control valve 10.

An electromagnetically actuated open/closed valve, not shown in the drawings, may be utilized advantageously with a thermostatically operative switch to admit or prohibit water flow to the evaporator bundle 1, in accordance with predetermined temperature cycle within the attic space to be cooled. For example, the thermostatically operative switch may be the same switch discussed in the preceding paragraph.

The amount of water flow into the evaporation bundle is controlled substantially in excess of the rate of water evaporation within the evaporation bundle 1. The amount of excess water flow must be sufficient to maintain solution of all minerals, salts, and other non-volatile contaminants of the evaporator feed water. Thus, if the amount of calcium carbonate is 50 percent of the saturation concentration in the feed water, the minimum water flow rate must be at least twice the rate of evaporation. If the rate of flow of the evaporator feed water is inadequate the prevent saturation at the operating temperature within the evaporator pads, the salts and/or minerals will precipitate within the evaporation pads, and the system will eventually become fouled and plugged with deposits of solid material to the extent that evaporation of water will cease.

The excessive water flow from the evaporation bundle flows into the conical collection section 5, of the adapter section 2. The water flows by gravity to the bottom of the conical funnel 5, and into the drain pipe 6. The excessive water, with dissolved salts, minerals, and other non-volatile subtances, flows through conduit 6, and into a utility sewer system or other secondary use. For example, the purge water from the evaporation device may be utilized efficiently for irrigation of lawns, gardens, or ornamental plantings. Secondary utilization of the evaporation purge water is not an object of the invention, and options are not shown within the drawings of this specific embodiment of the invention.

The construction and assembly of the components of the evaporation bundle 1, of the evaporation device., may be explained by referral to the six drawings of FIG. 2-7. FIG. 2 is a vertical, centerline, cross-section of the evaporation bundle. This embodiment of the invention provides two concentric, cylindrical evaporation pads with a cylindrical shell 1. The diameter of the inner evaporation cylinder 16, and the outer evaporation cylinder 17, are designed to provide an equal cross-sectional area for each of the three air passages. Thus, the velocity of air flow is approximately equalized through the first cylindrical passage within evaporation cylinder 16, and through the inner, concentric, annular passage described by the space between cylinder 16 and cylinder 17, and through the outer, concentric, annular passage described by the space between the outer evaporation cylinder 17, and the cylindrical containment shell 1. For this specific embodiment of the invention, the inside diameter of the inner evaporation cylinder 16 is 6 inches, and the inside diameter of the outer evaporation cylinder 17 is 8.5 inches, and the inside diameter of the containment shell 1 is 10 inches. The length of both evaporation cylinders 16 and 17, and the containment shell 1, are 48 inches. With air flow of 600 cubic feet per minute, the linear velocity of air flow is 20 feet per second.

The evaporation cylinders are constructed by wrapping a rectangular sheet of polyester fiber evaporation pad over a cylindrical support screen. The screen must be fabricated from a substance with high strength to weight ratio, good rigidity, and resistant to chemical reaction or microbiological attack. For example, the support screen may be fabricated advantageously from polyethylene or polycarbonate. The polyester fiber evaporation pad may be fastened to the support cylinder by mechanical clips, or by sewing with needle and polymeric fiber thread, or by heat seal. In this embodiment of the invention, the edges of the polyester pad are bonded by heat seal. The polyester pad may advantageously provide long fiber nap extending from both surfaces to provide a large amount of surface contact between the evaporation surface, and the air flow. For example, the fibers of the evaporation pads may extend from the surface of the pads into the air space for a length of one half to three quarters of an inch.

The support and spacing of the evaporation cylinders is provided by one or more annular spacers. In this embodiment of the invention, the inner evaporation cylinder is supported by two spacers 18, and the outer evaporation cylinder is supported by two spacers 19. The construction of the spacers is comprised of flat, circular, straps which conform with the inner and outer dimensions of the concentric cylinders. The inner and outer circular straps are connected by three or more spokes. The spacers may be advantageously fabricated by injection molding of suitable plastic materials such as polyethylene or polycarbonate.

The evaporation cylinders may be assembled by slipping the annulus spacers over the fibrous pads of the cylinders. The evaporation feed water is distributed over the top surface of each evaporation cylinder with use of flexible tubing 20 and trickle irrigation nozzles 21. In this embodiment of the invention, the tubing 20 is one quarter inch rubber irrigation tubing, and the trickle irrigation nozzles 21 are polyvinylchloride plastic. The irrigation nozzles are spaced along the top centerline of each evaporation cylinder with a spacing of 12 inches. The tubing 20 and irrigation nozzles 21 are anchored in place mechanically utilizing clips or staples 22. The clips 22 also serve to anchor the position of the annulus spacers 18 and 19 along the longitudinal axis of the evaporation bundle.

The assembly of the evaporation bundle may be explained by referral to FIG. 10. The inner evaporation cylinder 16, with two annular spacers 18, and irrigation tubing 20 with trickle flow nozzles 21, is slipped within the outer evaporation cylinder 17, with two annular spacers 19, and irrigation tubing 20 with trickle flow nozzles 21. Both evaporation cylinders are slipped within the containment shell 1. A retainer bar 24 is affixed to the air outlet end of the evaporation bundle utilizing four clips 25. The clips may be stapled or wired into the support screens of the inner cylinder 16 and the outer cylinder 17. The overall length of the retainer bar 24 must exceed the outside diameter of the evaporator containment shell 1, to prevent the evaporation bundles from sliding in telescoping manner into the adaptor section 2. For this embodiment of invention, the retainer bar 24 is 12 inches long.

The fastening of the retainer bar 24 completes the assembly of the evaporation bundle. The bundle is slipped within the evaporation bundle containment shell 1. The irrigation tubing 20 is connected to the water supply conduit 7. Referring to FIG. 9, strips of insulating foam rubber, or other substance suitable for absorption of vibration, are utilized to seal the assembly of the evaporation device with the strip 27 on the mounting flange 28 of the shroud 4 for the induced draft fan 3. In FIG. 8, similar strips of sound absorption substance 26 are utilized to seal the air inlet and outlets of adapter section 2.

After skillful construction, assembly, installation, and functional testing of the embodiment of invention illustrated in FIG. 1 through FIG. 2, and described in the foregoing paragraphs, the preferred embodiment of the invention will operate through one or more cooling seasons without personal service or maintenance. A thermostatically controlled on/off switch may be preset to activate the invention at 80 degrees temperature, and deactivate the invention at 74 degrees Fahrenheit temperature. When the temperature within the attic area reaches 80 degrees, the thermostat closes the electrical switch contacts to provide electrical power to motor M of induced draft fan 3. Furthermore, the electrical power will activate an integral solenoid/valve to the open position, which will admit pressurized evaporation water through the feed water conduit 7, and into the evaporation bundle 1. The evaporation water is distributed throughout the evaporation pads by the effects of capillary flow and gravity flow. The normal flow rate for the air is 600 cubic feet per minute, and the normal flow rate for the water is 15 pounds per hour. With inlet air of 110 degrees Fahrenheit dry bulb temperature, the air may be cooled to 90 degrees Fahrenheit with evaporation of 12.8 pounds per hour of feed-water. The air flow through the embodiment of the invention may be humidified and cooled to various extents, depending upon the temperature and humidity of the inlet air. For example, during a rain shower the embodiment of invention will continue to operate without any water evaporation because the relative humidity of the inlet air cannot be increased above the saturation level of 100 percent. The preferred embodiment of invention will operate with a 1/5 horsepower electric motor which requires less than 300 watts of power for each hour of operation.

A prototype of the preferred embodiment of the invention has been operated successfully for more than three complete cooling seasons in San Antonio, Texas. The embodiment of the invention has decreased the amount of refrigeration cycle air conditioning power required to maintain the air within a 2215 square foot ranch style house at 78 degrees Fahrenheit during the time interval from May through September from 8730 kilowatts to 4300 kilowatts. Thus, the electrical power economizing potential of the embodiment of the invention has been shown to be at least 4430 kilowatts per year. The amount of evaporation water required to achieve the electrical power savings has been shown to be less than 1500 gallons per month of operation. The specific house utilized for demonstration of the embodiment of the invention was constructed with 'state-of-the-art' ventilation, materials, and insulation during 1981. The ceiling of the house is insulated from the attic with eight inches of 'loose', pneumatically applied fibrous insulation material installed within the attic. Furthermore, the structure features natural convection draft cooling through screened vents under the eve of the roof overhang, with provision for hot air exhaust through screened louvres under each of three roof gables of the 'L-shaped' house. The thermal convection through the attic is further enhanced by the natural pressure drop created by wind flow around the structure.

The thermodynamic performance of the embodiment of this invention was increased and otherwise enhanced by taping the screened vents under the eves of the roof to prevent air flow. Furthermore, the thermodynamic performance was further improved by covering one of the three screened and louvred gable vents. The operation of the embodiment of the invention was thus optimized by intake of air through the normally up-wind louvred gable vent, flow through the evaporative cooler, flow through the entire 'L-shaped' attic space, and air flow out the gable vent at the farthest removed extremity of the attic space.

The embodiment of invention described in the foregoing paragraphs has achieved the advantages and improvements described in the OBJECTS OF THE INVENTION. The achievement of these objectives constitutes an unexpected result to practitioners with skill in the art. Although specific terms are employed in the drawings and descriptions, they are used in a generic and descriptive context and not intended for the purpose of limitation of the scope of applicability of my invention.

Having described and disclosed the present invention in clear and concise terms, I claim invention as follows:

1. An evaporative cooler apparatus comprising in combination:
   a. An induced draft fan, mounted within the attic of a building or structure to facilitate intake of outside, ambient air through a screened intake vent;
   b. An adapter section which receives air from the fan, and provides conduit for the air into the evaporation bundle; and receives excess evaporation water from the evaporation bundle, and provides conduit for said water into a water drain pipe or conduit;
   c. An evaporator bundle comprised of concentric elements such as cylinders of fibrous pad media within a containment shell;
   d. A means for suspension or support of said evaporation apparatus in an inclined position within the attic space of said structure to provide natural capillary and gravity flow of evaporation water from the higher end of said evaporation bundle to the lower end of said evaporation bundle;
   e. A conduit and flow control system to supply evaporation water to said evaporation bundle; said flow control system including trickle irrigation nozzles which are affixed to the top surface of each evaporation element said irrigation nozzles spaced to provide even distribution of evaporation water throughout the evaporation pads by the action of gravity and capillary flow of said evaporation water;
   f. Annular spacers to support the evaporation elements within the containment shell of the evaporation bundle in an array to facilitate equalized air velocity in all annular spaces between the evaporation elements, and facilitating flow of air with minimum resistance;
   g. A supporting means, such as a restraining bar, to prevent telescoping movement of the elements of the evaporation bundle.

2. The improvement of claim 1, further comprising:
   a. An evaporation bundle with element cross-sections comprised of oval, rectangular, on other convenient geometric shapes;
   b. An automatic on/of controller with cycle responsive to a thermostatically actuated switch within the attic space of the building or structure; said switch admitting electrical power to the motor of said fan, and actuating a control valve to admit water to said evaporation bundle;
   c. A material for the evaporation pads comprised of hydrophilic substance with long, fibrous nap to create a large water to air evaporation interfacial area;
   d. A bundle of evaporation elements with major cross-section dimension substantially greater than 10 inches to increase the evaporation surface area;
   e. A bundle of evaporation elements with axial length substantially greater than 48 inches to increase the evaporation surface area;
   f. An induced draft fan with capacity greater than 600 cubic feet per minute to achieve a greater rate of air flow through said evaporation bundle and through said attic space of said building.

3. The improvement of claim 1, further comprising modification of natural convection apertures in said attic space of said structure to achieve a once-through forced draft flow of cooled, humidified air to achieve greater thermodynamic cooling efficiency; said modification comprising:
   a. a mechanical means such as duct tape to seal the vents under the eves of the roof overhang;
   b. a mechanical air intake in the roof position of said building structure most nearly up-wind with respect to prevailing natural summer wind direction;
   c. a mechanical means such as plastic tarpaulin to close attic ventilation ports, excepting one exhaust vent most remotely located in the attic extremity with respect to the fresh air intake vent.

* * * * *